United States Patent [19]

Bartow

[11] Patent Number: 5,239,132

[45] Date of Patent: Aug. 24, 1993

[54] STRAP FOR RETAINING JUNCTION BOX

[76] Inventor: Donald W. Bartow, 618 Shoreway Cir., NW., Massillon, Ohio 44646

[21] Appl. No.: 749,146

[22] Filed: Aug. 23, 1991

[51] Int. Cl.⁵ .............................................. H02G 3/12
[52] U.S. Cl. ...................................... 174/58; 220/3.6; 248/27.1; 248/906
[58] Field of Search .......................... 174/58; 220/3.6; 248/27.1, 906

[56] References Cited

U.S. PATENT DOCUMENTS

| | | | |
|---|---|---|---|
| 1,782,329 | 11/1930 | Webster. | |
| 1,816,584 | 7/1981 | Hussar | 220/3.6 |
| 1,999,194 | 4/1935 | Hubbell, Jr. | 174/58 |
| 2,346,402 | 4/1944 | Snyder | 248/906 X |
| 2,514,176 | 7/1950 | Borkowski | 248/27 |
| 3,963,204 | 6/1976 | Liss | 248/27 R |
| 4,180,226 | 12/1979 | Matte | 248/27.1 |
| 4,757,967 | 7/1988 | Delmore et al. | 248/27.1 X |

Primary Examiner—Leo P. Picard
Assistant Examiner—David A. Tone
Attorney, Agent, or Firm—Oldham, Oldham & Wilson Co.

[57] ABSTRACT

A device for retaining an electrical junction box in flush relationship with a wall or a ceiling has a thin elongate strap. The ends of the strap are longitudinally bifurcated to provide fingers to be deformed around the edges of the box as well as the outer wall surface. Wings extending out from a side edge of the strap are used to provide support against the inner wall surface.

2 Claims, 5 Drawing Sheets

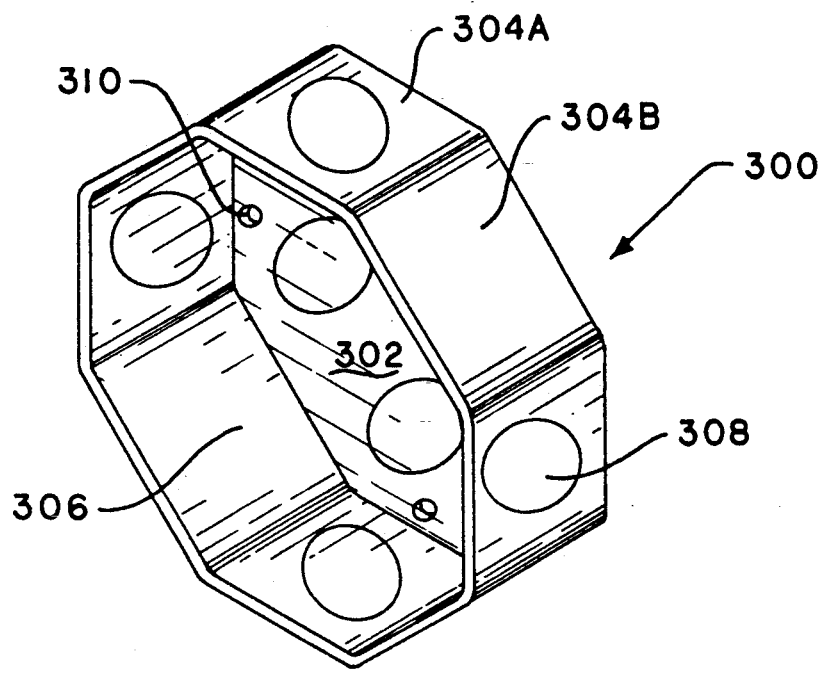
FIG.—1C    PRIOR ART
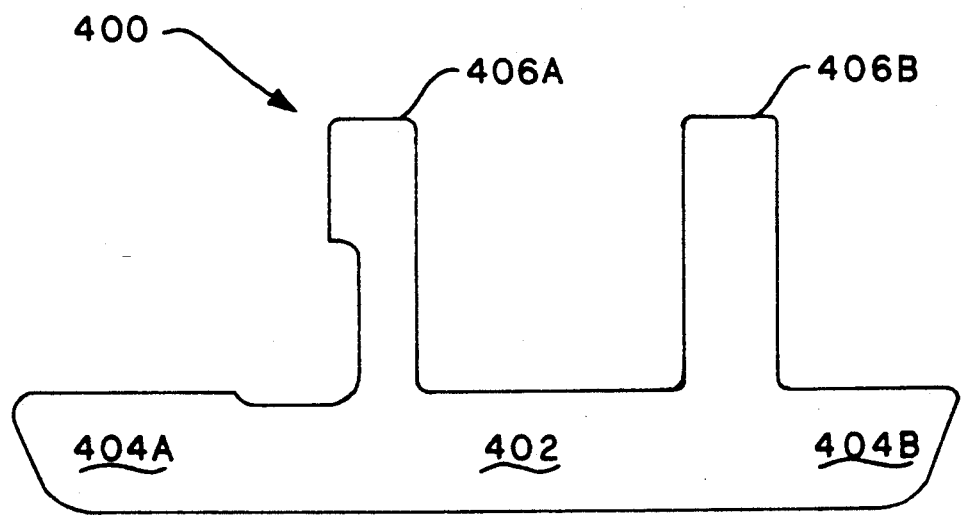
FIG.—2    PRIOR ART

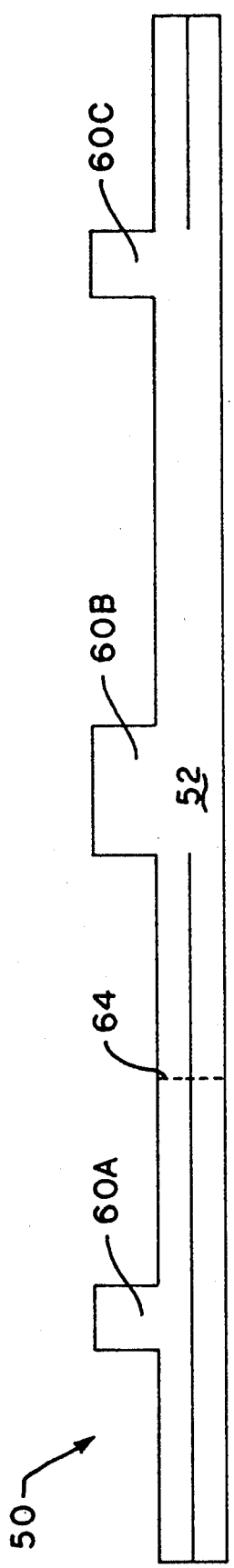
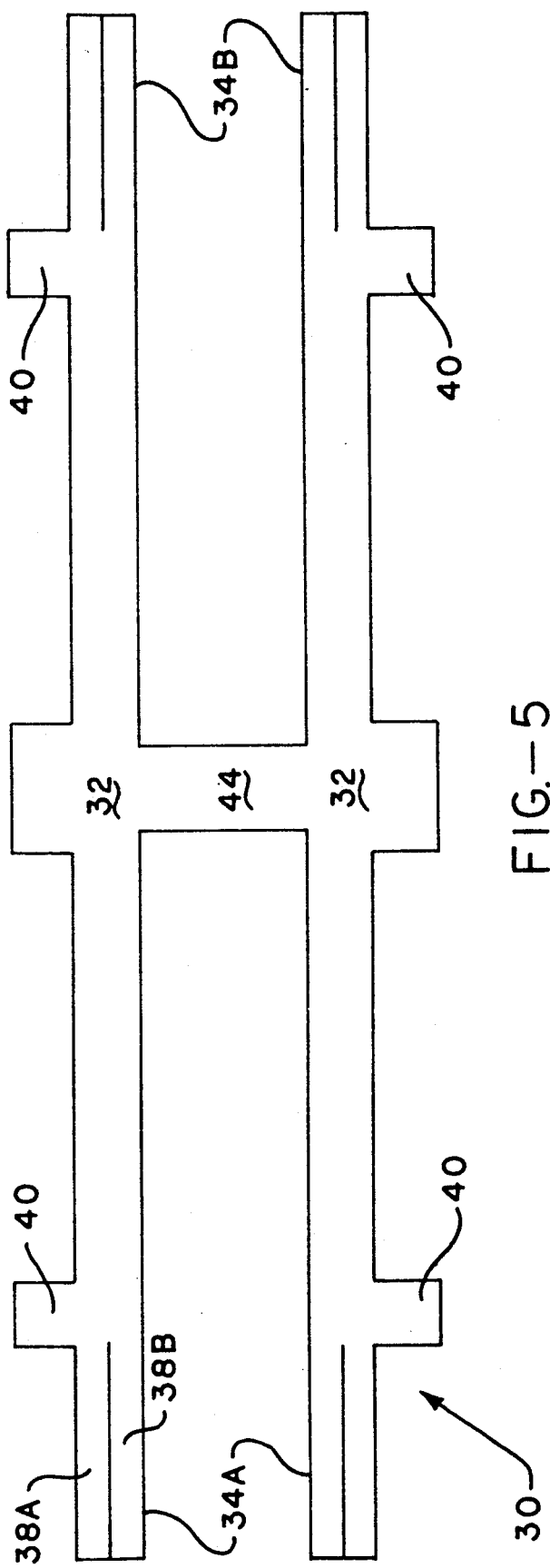

STRAP FOR RETAINING JUNCTION BOX

The present invention generally relates to a strap for retaining a junction box or similar device in flush relationship in an appropriately-shaped aperture in a planar surface. More particularly, the present invention relates to a strap designed to hold a junction box in such a flush relationship with an aperture in a ceiling tile or wallboard. Even more particularly, the present invention relates to a strap having finger members at each end thereof for grasping the junction box and the outer surface of the planar surface and at least one wing member disposed along the length of the strap to retain the junction box against the inner surface of the planar surface.

BACKGROUND ART

The electrical junction box is well known as a device for providing electrical service through a wall. Electrical codes in most communities require that all but low-voltage electrical applications, such as telephone jacks, computer lines and the like, be fed into and through such junction boxes. In installing these types of junction boxes, it is important that the box be held relatively securely in the wall until the cover plates, etc. are completed and installed. It is particularly important that the junction boxes not fall backwards into the wall cavity. Although it is preferred practice to locate these boxes adjacent to wall studs, to which they may be secured, this is not always convenient, especially in situations of retrofitting or installing electrical service lines after construction of the wall is completed.

The prior art is replete with devices that prevent the junction box from falling outwardly from the wall cavity, that is, they retain the box in the wall. But these devices do not have the capacity to prevent inward falling of the box. Another problem encountered with installation along vertical walls (as opposed to on horizontal surfaces such as ceilings) is that the prior art devices do not prevent downward slippage of the box.

SUMMARY OF THE INVENTION

A first object of the invention is to provide a device to retain an electrical junction box positioned in an aperture in a planar surface in a flush relationship with the aperture so that the box does not move relative to the aperture.

A second object of the present invention is to provide a single device for retaining such a junction box so that little or no assembly is required at the point of installation.

A third object of the present invention is to provide a device for securing such junction boxes that obstructs as few openings in the junction box as possible.

These and further objects of the present invention are achieved by a device for retaining a junction box in flush position against a planar member such as a wall or a ceiling. Such a junction box would have a planar back surface and a plurality of pairs of opposing side surfaces extending upwardly normal to the planar back surface, such that the back surface and side surfaces effectively constitute an open chamber for housing electrical junctions, and such a planar member would have inner and outer planar surfaces and have an aperture therethrough to accommodate the junction box. The device comprises a flexible elongate strap member having first and second ends and an intermediate portion between the ends. The intermediate portion has a pair of opposing edges and each end is provided with a means for retaining the junction box and the first planar surface. In such a device, the preferred means for retaining comprises first and second adjacent finger members, these being effectively formed at each end of the strap member by an axial bifurcation of the strap member. The elongate strap member is long enough that one of the finger members at the first end can wrap over the first of a pair of opposing side surfaces and one of the finger members at the second end can wrap over the second of the pair of opposing side surfaces while the strap member is in close accommodation to the outside surfaces of the opposing side walls and rear wall of the box. The device is further provided near each end with means for retaining the strap member against the second planar surface of the planar member. The particularly preferred means for retaining against the second planar surface comprises a wing member which extends outwardly along the edge of the intermediate portion of the strap member This wing member is capable of being deflected away from the plane of the strap member along the line of attachment to the strap member.

BRIEF DESCRIPTION OF THE DRAWINGS

The novel strap for retaining an electrical junction box will be better understood when reference is had to the attached drawings, in which identical parts are indicated by identical feature numbers.

FIG. 1C shows an octagon electrical junction box, as known in the prior art, in perspective view;

FIG. 2 shows a plan view of a prior art device for retaining electrical junction boxes in walls or ceilings;

FIG. 5 shows a second embodiment of the present invention in plan view; and

FIG. 6 shows a third embodiment of the present invention in plan view.

DETAILED DESCRIPTION OF THE DRAWINGS

Figure 1A:
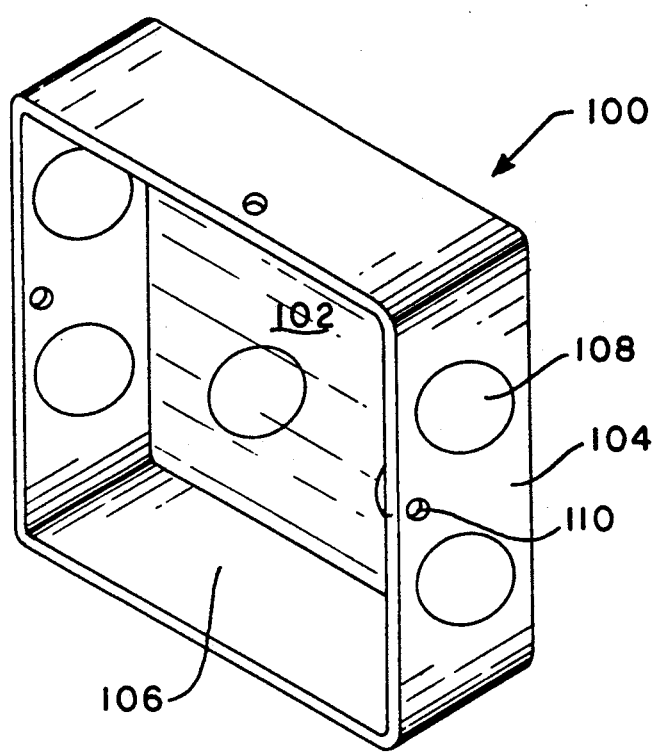
FIG. 1A shows a four square electrical junction box, as known in the prior art, in perspective view.

The electrical junction boxes that are known in the prior art are basically of three main types, although other types are known. The first is of these is known as a four square electrical box, which is shown as 100 in FIG. 1A. Such a box 100 comprises a planar square back wall 102 with four rectangular surfaces 104 extending perpendicularly upward from the edges of the square back wall 102, thereby forming a rectangular box open on a front surface 106 and closed on the other five surfaces. A plurality of punchouts 108 on the five surfaces 102, 104 of the box 100 are used to lead wires into the junction box. The open surface 106 is positioned adjacent to an aperture in a wall and is generally covered by a cover plate that helps to position the junction box 100 in the wall. It is common to have a plurality of apertures 110 on the back wall 102 and/or side surfaces 104 of the junction box 100 so that direct affixation of the box to a stud in the wall may be achieved, but it is readily recognized that it is often desirable to position the junction box at a point other than adjacent to a stud.

Figure 1B:
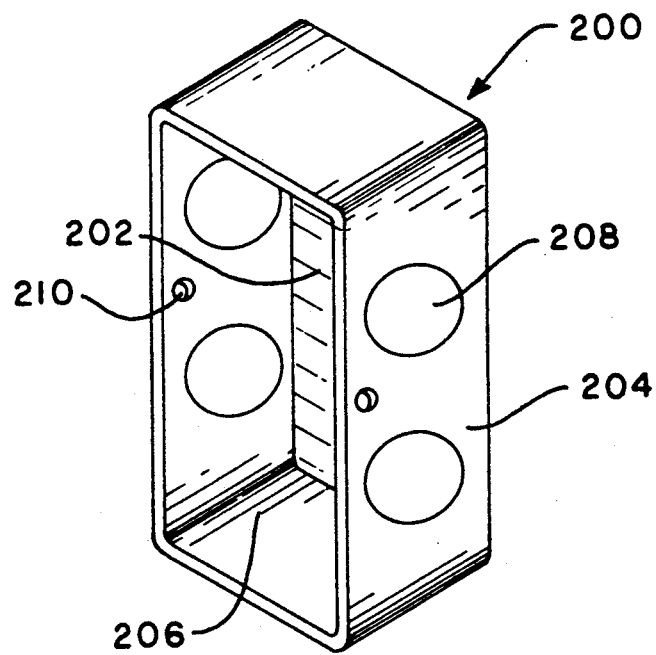
FIG. 1B shows a two-inch gang electrical junction box, as known in the prior art, in perspective view.

The second type of junction box is known as the two inch (2") gang box 200, which is shown in perspective in FIG. 1B. This box 200 also has a planar rear wall 202 with four side walls 204 extending essentially perpendicularly upward from the rear wall 202 to again form a box with an open front surface 206. As with the four square box 100, the 2" gang box 200 is used for positioning electrical connections, plugs and the like at the interface of a planar wall having an aperture therein and the box 200 will have knockouts 208 and apertures 210, the former for introducing wires into the box 200 and the latter for affixing to studs or other structures.

The third type of junction box known to prior art is known as the octagon box. The octagon box 300, as shown in FIG. 1C, is not strictly octagonal because every other upwardly extending side wall 304B is somewhat curved but the general structure, particularly the rear wall 302 and four of the side wall 304A, as well as the open front surface 306, knockouts 306 and apertures 310 are very similar to those associated with the four square box 100 described above. Because of the structural similarities of these three types of boxes, we will generally refer to the use of the present invention with relation to the four square box 100, although it will be recognized that the utilization of the device with the other types of boxes is certainly within in the scope of this invention.

One method of mounting a box such as a four square box 100 that is known in the prior art is manufactured by Gam-pak Products Corporation of Hillside, N.J. and sold as a switch box support, catalog No. 8102. The device 400, as shown in plan view in FIG. 2, comprises an elongate bar 402 of thin metal, apparently preferred to be galvanized, having first and second ends, 404A and 404B, and two fingers, 406A and 406B, extending outwardly from a single side of the intermediate portion between the two ends 404. The length from the first end 404A to the second end 404B is somewhat longer than either the aperture or the box which will be secured into the wall, so that the devices 400 are placed into the aperture by turning them 90 degrees and inserting them. They are thereafter positioned so that the longitudinal dimension of the elongate bar 402 runs parallel to the front surface of the box to be positioned and the fingers 406 extend outwardly from the aperture. With one such device 400 on each side of the box 100, the fingers 406 are bent inwardly over the box side walls 104 into the box interior so that a pair of the devices 400, one on each side of the box 100 firmly holds the box in place against the wall. It will be readily recognized that this manner of retaining a junction box 100 in a wall using the devices 400 requires rather dexterous manipulation of the box 100 and the devices 400. It is also apparent that the devices 400 must be used in pairs. It is quite often a problem that only a single device 400 will be found, the other devices having been misplaced. It will also be understood that the devices 400 only prevent outward movement of the box 100 through the aperture. Since the bending engagement of the fingers 406 of the device 400 is at the edges defining the front surface 106, a rearward force, that is a push into the wall, can result in the loss of the switch box 100 into the wall. For these and other reasons explained further below, it is desirable to use a retaining strap of the present invention for retaining switch boxes in walls.

Figure 3:
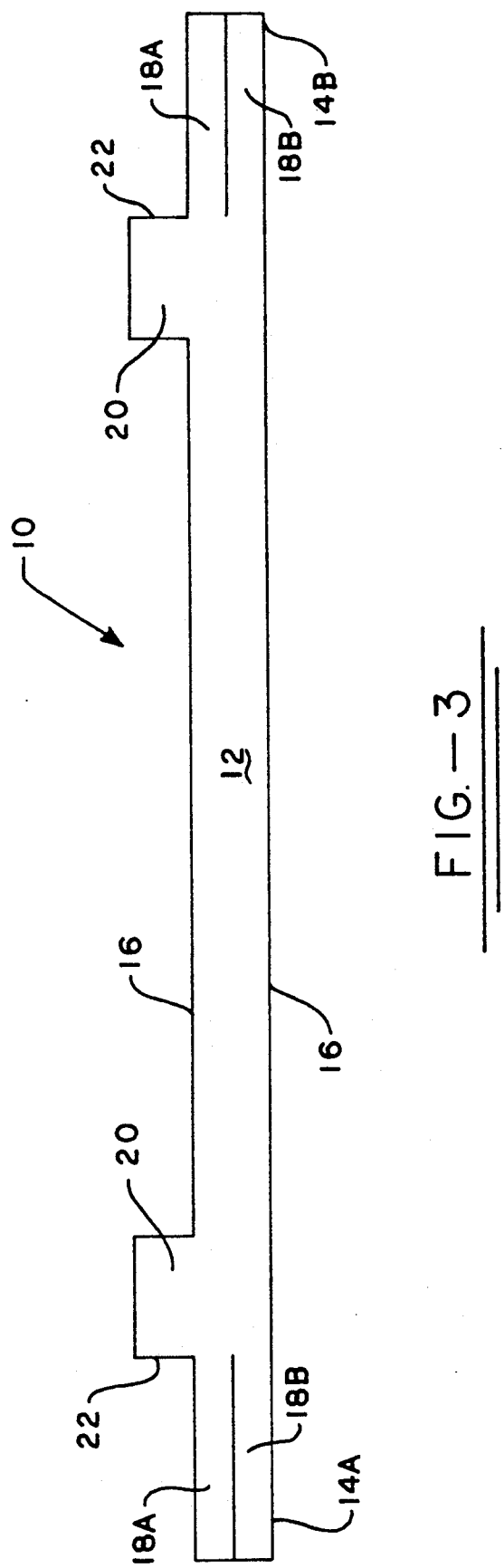
FIG. 3 shows a plan view of a first embodiment of the present invention.

Referring now to FIG. 3, a first embodiment 10 of the strap device of the present invention is disclosed. As seen in the plan view, the device 10 is a relatively thin elongate strip 12 of material, preferably a metallic material and certainly a material that is easily deformable to accommodate itself to the exterior surface of a switch box 100. The elongate strip has first and second ends 14A and 14B with an intermediate portion between the respective ends 14, as well as two opposing side edges 16 extending along the length of the strip portion 12. In all embodiments of the invention, the first and second ends 14 are each adapted with means 18 for grasping a front peripheral edge of the switch box 100 as well as an outside planar surface of the wall in which the switch box 100 is being mounted. For that reason, the length of the device 10 from the first end 14A to the second end 14B must be long enough that, even after the means 18 for grasping at each end 14 is engaged with the box 100, there is sufficient length along the strip 12 for the device 10 to traverse a first side surface 104, the rear surface 102 and yet a second opposing side surface 104 of the switch box 100 that is being supported. In the preferred embodiment of the invention, this means 18 for grasping is achieved by longitudinally bifurcating the end portions of the strip 12 so that the respective first and second ends 14 of the strap member comprise a pair of axially extending finger members 18A and 18B that are bendable transverse to the longitudinal axis at the innermost point of bifurcation.

Another feature of the present invention is the placement of at least first and second wing members 20 along a single side edge 16 of the strip 12. These wing members 20 are preferably rectangular in shape. They are positioned along the strip 12 such that they may engage the inner planar surface of the wall against which the switch box 100 is being mounted. In general, this means that the outermost ends 22 of the wing members 20 must be spaced such that they are approximately as far apart from each other as the distance required for the strip 12 to traverse the two side surfaces 104 and the back surface 102, less twice the thickness of the wall in which the box is being placed. This allows the outermost ends 22 of the wing members to bear against the rear surface of the wall when the box 100 is positioned flush against the wall aperture. In this manner, the wing members 20 serve the same purpose as the ends 404 of the devices 400 known in the prior art, that is, they provide a support point against the rear surface of the wall to prevent movement of the switch box, once engaged, outwardly through the wall cutout. Although the wing members 20 are manufactured so that they extend outwardly from the strip 12 in a single plane, it will be recognized that the deformable nature of the strip 12 should be such that either wing member 20 may be deformed along the line of attachment with the edge 16 of the strip 12 from which it extends. This deformation of the wing member 20 may be desirable in positioning the box 100. In manufacturing the device 10, it may be found to be preferable to score the intended line of deformation, that is, the line of attachment of wing member 20 to strip 12, somewhat to facilitate the deformation.

In a typical application of the prior art devices 400, the elongate member 402 of the device will cover entirely any and all of the knockouts 108 located on the side wall 104 of the box 100, thereby rendering those knockouts useless. Because of the relatively narrow shape of the strip 12 of the present invention 10, it will be recognized that the strip 12 will leave the side knockouts 108 of the box 100 still useful to the electrician for running wires into the interior of the box. Generally, only a central knockout 108 in the rear planar surface 102 of the switch box will be covered by the strip 12, and even this may avoided if the strip 12 is properly sized and the device 10 is properly positioned.

Figure 4:
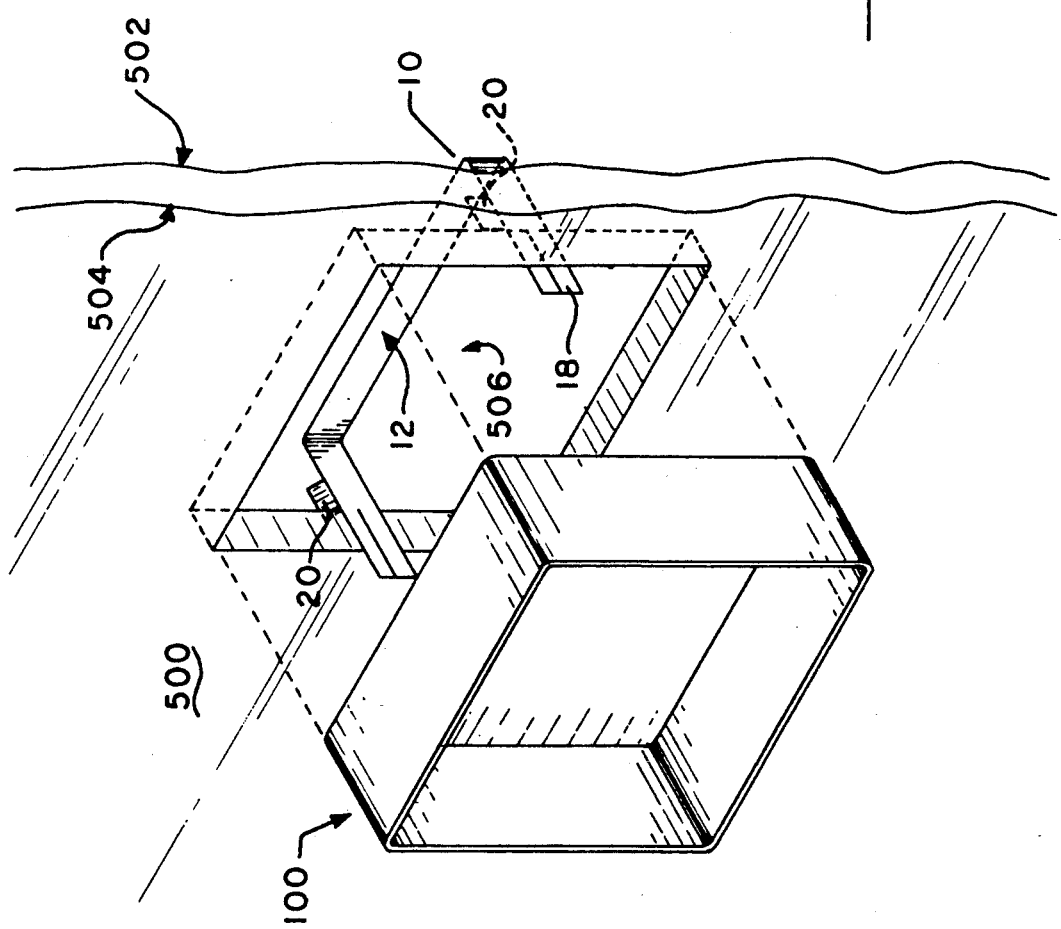
FIG. 4 shows a perspective view of the first embodiment of the present invention in operative engagement with a junction box and a wall.

Use of the present invention 10 in a wall 500 in conjunction with a junction box 100 of the prior art is shown in FIG. 4. Before placement in the wall 500, the device 10 is deformed into proper shape for conforming to the outside of junction box 100 by placing the box 100 on the strip member 12 so that the rear surface 102 rests upon the central portion of the strip 12. The first and second ends 14 of the strip 12 extend outwardly from the sides 104 of junction box so that the traverse of the rear surface 102 is made perpendicular to the edges thereof. This should be done in a symmetrical fashion so that the same length of strip 12 extends outwardly on each side of the junction box. The portions that extend outwardly are bent forward, that is, along the sides 102 of the junction box 100 and towards its open surface 106, so that the strip 12 is accommodated closely to the rear surface 102 as well as a pair of opposing side surfaces 104. In this structure, it will be recognized that the means 18 for grasping extend outwardly from the junction box 100 almost as extensions of the side walls 102. In this deformed U-shape, the device 10 is inserted into the aperture 506 in the wall 500. The wing members 20 are now deformed outwardly from the strip 12, thereby presenting a surface larger than the aperture 506 in which the box 100 is to be retained and providing support against the rear surface 502 of the wall 500. Using the finger members 18A and 18B that comprise the preferred embodiment of the means 18 for grasping to hold the device in place, the junction box 100 may be pushed into position through the wall cutout 506 and secured in place. This is achieved by bending a first finger member 18A at each end of the device 10 over the peripheral edge of the junction box 100 and down into the inside surface of the side wall 104 and by folding a second finger member 18B at each end of the strip 12 outwardly over the outside wall surface 504, thereby retaining the junction box in the wall. Once retained in this manner, the box is prevented not only from outward movement through the aperture 506, but also from inward movement into the wall cavity.

Although the preferred embodiment presented above shows only a single strap member, it is clear that an alternative embodiment 30 would comprise two such strip members 32 in parallel relationship with the wing members 40 on each extending outwardly in opposing directions, as is shown in plan view in FIG. 5. Each strip 32 has two ends, 34A and 34B, each end being bifurcated longitudinally to provide grasping fingers 38A and 38B. In such an embodiment, the respective strip members 32 are connected to each other by a narrow strip 44 running transverse to the longitudinal axis of each strip member 32, preferably at the middle of the longitudinal dimension of each strip member 32. A purpose for using this embodiment 30 would be to provide further stability in the same plane as the planar surface to which the box 100 is being affixed; that is, the box 100 would be retained vertically when being positioned in a vertical wall. To achieve this purpose, the respective strip members 32 should be positioned far enough apart that the respective wing members 40 on the first and second strips 32 will engage the wall aperture 506 at each side of the wall aperture so that the retention in the planar direction is achieved.

In a yet further embodiment 50 of the invention, as shown in FIG. 6, a single retaining strip 52 is provided with at least three wing members 60 along a single side edge 56 of the strip. The relative position of the first and third wing members, 60A and 60C, respectively, is such that a larger junction box, for example, a four square box, may be accommodated through its use. The first and second wing members, 60B and 60C respectively, are positioned such that they are appropriate with use with a 2" box. Since the strip member 52 of the present invention is a relatively thin deformable member, such as aluminum or tin, the use for the device 50 may be determined at the point of use and the strip 52 conformed to a shorter length by cutting off one end if desired. For example, the cut line to use device 50 with a smaller box may be as shown as 64 on FIG. 6. In this manner, all types of junction boxes may be positioned using a single variety of device 50. This has definite advantages in terms of availability of the proper retaining strap at the job site. It will be understood, of course, that the bifurcation of each end 52 must extend inwardly far enough at the end having two wing members 60A and 60B so that the innermost grasping means is useful. Because the longitudinal bifurcation of the strip 52 does not affect the ability of the device 50 to provide the desired retaining effect, the addition of the third wing at one end of the strip member is not believed to adversely affect the usefulness of the device.

It should be apparent from the disclosure that the retaining device of the present invention is useful in retaining a junction box in flush relationship not only with a vertical planar surface such as a wall, but also with a horizontal planar surface such as a ceiling. To that effect, the retaining device of the present invention is useful in mounting ceiling junction boxes for lighting fixtures and the like.

It should also be apparent from the description that the retaining strap of the present invention may be used with low voltage applications such as computer and telephone connections, even when the electrical code does not require or mandate the use of a junction box. The purpose of a retaining device in such an application would be to facilitate the placement of a cover plate with the wall.

It will also be apparent from the above description that the retaining device of the present invention may be used with a broad variety of planar surfaces including, for purpose of illustration only, ceiling tile, sheet rock, wood, metal, paneling and plywood.

It is also apparent from the description that the retaining device of the present invention can be used in conjunction with heating and air-conditioning duct to retain a duct outlet box in flush relationship with a planar surface such as a wall, a ceiling or a floor.

While in accordance with the patent statutes, the best mode and preferred embodiment of the invention have been described, it is to be understood that the invention is not limited thereto, but rather is to be measured by the scope and spirit of the appended claims.

What is claimed is:

1. A device for retaining a junction box having a planar back surface with a plurality of pairs of opposing side surfaces extending upwardly normal to said planar back surface, such that the back surface and side surfaces effectively constitute an open chamber for housing electrical junctions, in flush position against a planar member having first and second planar surfaces and with an aperture therethrough to accommodate said junction box, said device comprising:

a flexible elongate strap member having first and a second ends and an intermediate portion therebetween, said intermediate portion having a pair of opposing edges;

each said end provided with first and second adjacent finger members for retaining said junction box and said first planar surface, said finger members effectively formed at each end of the strap member by an axial bifurcation thereof; and at lest two outwardly extending wing members along the edges of the intermediate portion, each said wing member capable of being deflected away from the plane of the strap member along the line of attachment to the strap member to retain the strap member against the second planar surface.

2. The device of claim 1 wherein the elongate strap member is of sufficient length that one of the finger members at said first end can wrap over the first of a pair of opposing side surfaces and one of the finger members at the second end can wrap over the second of the pair of opposing side surfaces.

* * * * *